Patented Oct. 23, 1951

2,572,569

UNITED STATES PATENT OFFICE 2,572,569

SUBSTITUTED ETHYLENEDIAMINES AND PREPARATION OF THE SAME

Kenneth L. Howard, Westfield, N. J., assignor to American Cyanamid Company, New York, N. Y., a corporation of Maine No Drawing. Application June 7, 1947, Serial No. 753,384

9 Claims. (Cl. 260—256.4)

1

The present invention relates to new organic compounds and to processes of preparing the same.

The new compounds of the present invention may be illustrated by the following general formula:

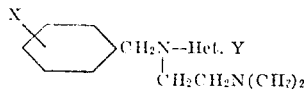

in which at least one of the radicals X and Y is halogen and Het. is a nitrogen containing heterocyclic ring such as pyridine, pyrazine, pyridazine, pyrimidine, etc. Acid salts of these compounds are easily prepared by treatment of the compounds with an acid and are included within the scope of the invention.

The compounds are generally oils at room temperature. The salts, however, are usually crystalline and have definite melting points which are in general above 150° C.

I prefer to prepare the compounds of the present invention by reacting benzyl chloride or a halogenated benzyl chloride with a dimethylaminoethyl heterocyclic amine or a dimethylaminoethyl halogenated heterocyclic amine thus producing compounds having at least one halogen group present.

The compounds can also be obtained for instance by reacting a nitrogen containing halo or polyhalo heterocyclic compound with dimethylaminoethylbenzylamine or with a dimethylaminoethylhalobenzylamine to produce compounds having at least one halogen present on one of the rings.

Alternatively the compounds can be prepared by reacting a halo benzylamino heterocyclic compound or a benzylamino halo heterocyclic compound with dimethylaminoethylchloride.

In the preferred process and the alternative process, it is desirable to use an alkali metal salt of the secondary amine since by this method the substitution is directed to the secondary amino radical and very little substitution takes place on the nitrogen of the heterocyclic ring.

In the method described using the halo or polyhalo heterocyclic nitrogen containing intermediate, it is usually desirable to have present an acid binding substance such as pyridine, quinoline, triethylamine, sodium hydroxide, sodium bicarbonate, and the like.

The reactions can be carried out at a temperature of from about 0° C. to about 180° C. in an inert non-hydroxylated organic solvent, preferably a hydrocarbon such as benzene, toluene, ortho-dichlorobenzene, xylene, etc., under substantially anhydrous conditions.

The compounds of the present invention are generally obtained in the form of salts since they are solids and therefore more easily purified and characterized. Should the free compound be desired, it can be obtained by treating the salt with an equivalent amount of alkali.

The new compounds have been found to possess excellent antihistaminic properties. They are effective in treating such allergic conditions as hay fever, certain types of asthma, food allergies and similar conditions. In general, they are more active and less toxic than other antihistaminic compounds used in the past. The preferred compounds are those in which the benzyl group is halogenated.

The following examples illustrate the various methods of preparing compounds of the present invention. Parts are by weight unless otherwise indicated.

EXAMPLE 1

*N,N-dimethyl-N'-(p-bromobenzyl)-N'-(2-pyridyl)-ethylene-diamine hydrochloride*

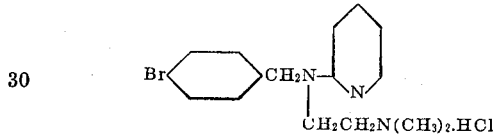

To a solution of potassium amide in liquid ammonia which is prepared from 7.8 parts of potassium is added 33 parts of N,N-dimethyl-N'-(2-pyridyl)-ethylenediamine and the ammonia is replaced by toluene. A quantity of 42.6 parts of p-bromobenzyl chloride is added to the suspension of the potassium salt and the mixture is stirred on the steam bath for eleven hours. The mixture is then cooled, filtered and the filtrate is washed with water and dried. The toluene is distilled in vacuo and the residue is fractionated in vacuo. Thirty parts of N,N-dimethyl-N'-(p-bromobenzyl)-N'-(2-pyridyl)-ethylenediamine is obtained as a yellow oil boiling at 184°–190° C./1.5 mm.

If desired the monohydrochloride can be prepared by treating the above material with an equivalent of hydrogen chloride in ethyl alcohol and precipitating the product with ether. The hydrochloride salt crystallizes from ethyl acetate in colorless needles having a melting point of 183°–185° C.

EXAMPLE 2

*N,N-dimethyl-N'-(m-bromobenzyl)-N'-(2-pyridyl)-ethylenediamine hydrochloride*

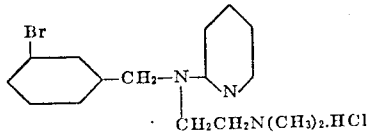

A toluene suspension of potassium amide which is prepared from 15.6 parts of potassium is treated with 66 parts of N,N-dimethyl-N'-(2-pyridyl)-ethylenediamine and heated for thirty minutes on a steam bath. The suspension is cooled and treated with 85 parts of m-bromobenzyl chloride and then heated on the steam bath for sixteen hours. The mixture is cooled and filtered. The filtrate is washed with water, dried and the toluene is distilled at reduced pressure. The residue is fractionated in vacuo and 50 parts of N,N-dimethyl-N'-(m-bromobenzyl)-N'-(2-pyridyl)-ethylenediamine is obtained as a yellow oil. The monohydrochloride is prepared as in the previous example and recrystallized from ethyl acetate.

EXAMPLE 3

*N,N - dimethyl-N' - (o-chlorobenzyl) - N' - (2-pyridyl) ethylenediamine hydrochloride*

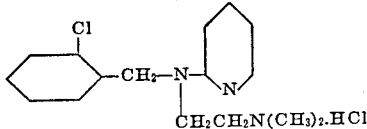

To a suspension of potassium amide in liquid ammonia which is prepared from 21.5 parts of potassium is added 86.5 parts of N,N-dimethyl-N'-(2-pyridyl) ethylenediamine. Then 43.3 parts of toluene is added with stirring and the mixture is heated for 10 minutes after all the ammonia is driven off. To the mixture is added 88 parts of o-chlorobenzylchloride which caused the mixture to boil gently. After heating an hour on a steam bath, 43.3 parts of toluene is added to facilitate the filtration which followed. Distillation of the filtrate yielded 74 parts of N,N-dimethyl-N'-(o-chlorobenzyl)-N'-(2 - pyridyl) ethylenediamine, boiling point 161°–4°/1 mm. This is converted to the monohydrochloride by dissolving in ether and adding an equivalent of alcoholic hydrogen chloride. Recrystallization from isopropyl alcohol yields colorless crystals having a melting point of 203°–204.5° C.

EXAMPLE 4

*N,N - dimethyl - N' - benzyl - N' - (5 - chloro-2-pyrimidyl) ethylenediamine hydrochloride*

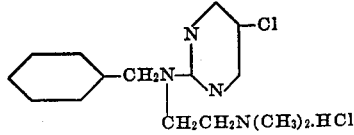

During a 20 minute period, 60 parts of 2,5-dichloropyrimidine is added to a warm (98° C.) solution of 100 parts of N,N-dimethyl-N'-benzyl ethylenediamine in 160 parts of pyridine. The addition is regulated so that the temperature of the reactants is maintained at 98°–102° C. The reactants are then heated for two and one-half hours on a steam bath, cooled, treated with 75 parts of 50% sodium hydroxide solution, and steam distilled to remove the pyridine. The aqueous layer is separated from the oil layer and discarded. The oil layer after standing overnight is partially crystalline. The crystalline residue is removed by filtration and the filtrate distilled. The fraction which distills at 160°–204° C. at 5 mm. pressure is collected. To 41 parts of this distillate is added sufficient hydrogen chloride in absolute alcohol to form a monohydrochloride. The crystalline product (30.3 parts) is dissolved in 60 parts of boiling absolute alcohol, treated with 2 parts of activated carbon and filtered. The product which separates is removed by filtration, slurried with alcohol and ether, refiltered, and dried at 105° C. The white crystalline N, N-dimethyl-N'-benzyl-N'-(5-chloro-2-pyrimidyl) ethylenediamine hydrochloride melts at 188°–190° C.

EXAMPLE 5

*N,N - dimethyl - N' - (4 - chlorobenzyl) - N'-(2-pyrimidyl) ethylenediamine hydrochloride*

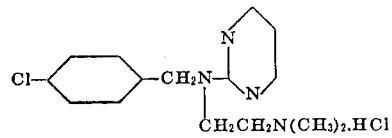

To 43 parts of N,N-dimethyl-N'-(4-chlorobenzyl) ethylenediamine is added 17 parts of 2-chloropyrimidine and the reaction mixture is heated slowly until an exothermic reaction occurs. The exothermic phase of the reaction is moderated by the use of ice water cooling and the temperature of the reactants does not rise above 120° C. When the exothermic phase has passed, the reaction mixture is heated on a steam bath for two hours, dissolved in warm water, and made alkaline to phenolphthalein with sodium hydroxide solution. After removal of the lower layer, the oil layer is distilled and the fraction which distills at 150°–218° C. at a pressure of 3 mm. is collected. Upon redistillation the fraction which distills at 162°–165° C. when the pressure is 0.90 mm. is collected. This light yellow colored oil is dissolved in 50% aqueous alcohol and is brought to a pH of 5.2 with dilute hydrochloric acid. The solution is evaporated to dryness and the residue is fractionally crystallized from acetone to yield the product, N,N-dimethyl-N'-(4-chlorobenzyl)-N'-(2-pyrimidyl) ethylenediamine hydrochloride which melts at 166°–167.2° C.

EXAMPLE 6

*N,N-dimethyl-N'-(4-chlorobenzyl)-N' - (2 - pyridyl) ethylenediamine hydrochloride*

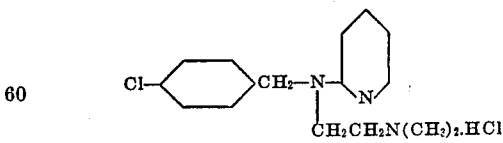

A solution comprising 40 parts of 2-bromopyridine, 100 parts of N,N-dimethyl-N'-(4-chlorobenzyl) ethylenediamine and 100 parts of quinoline is heated at 140°–145° C. for 5 hours. The oil layer after washing with 30% sodium hydroxide solution is distilled and the fraction which distills at 142°–170° C. when the pressure is one millimeter is collected. This oil is converted to the hydrochloride and recrystallized from a mixture of mixed amyl alcohols and ether. The monohydrochloride salt of N,N-dimethyl-N'-(4-chlorobenzyl)-N'-(2-pyridyl) ethylenediamine is obtained which melts at 167°–168.4° C.

EXAMPLE 7

*N,N-dimethyl-N'-benzyl-N'-(5 - chloro - 2 - pyridyl) ethylenediamine hydrochloride*

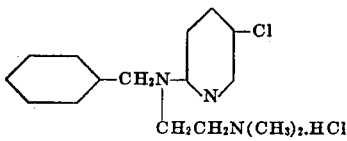

To 21.8 parts of 5-chloro-2-benzylaminopyridine in 100 parts of toluene is added 2.2 parts of lithium amide. The reaction mixture is heated at reflux temperature and stirred for two hours. A solution of 10 parts of dimethylamino-ethylchloride in 50 parts of toluene is then added dropwise during 15 minutes. Heating is continued for two hours at reflux temperature, the solution is cooled, and the salt which separates is removed by filtration. The filtrate, after removal of the toluene, is distilled and the fraction which distills at 163°–185° C. when the pressure is 20 microns, is collected. The yellow oil solidifies in part to a product which melts at 113.8° to 115.6° C. The solid was removed by filtration and discarded. Electrometric titration of the filtrate indicates that the 24.4 parts of product is 68% pure. A quantity of hydrogen chloride in absolute alcohol sufficient to form the monohydrochloride is added. The white N,N-dimethyl-N'-benzyl-N'-(5-chloro-2-pyridyl) ethylenediamine hydrochloride which separates is recrystallized from acetone and has a melting point of 179°–180° C.

I claim:

1. N,N-dimethyl-N'-(meta-bromobenzyl) - N' - (2-pyridyl) ethylenediamine.

2. N,N-dimethyl-N' - benzyl - N' - (5 - chloro - 2-pyridyl) ethylenediamine.

3. A method of preparing an N,N-dimethyl-N'-(meta-bromobenzyl) -N' - (2 - pyridyl) ethylenediamine which comprises heating together in a hydrocarbon solvent under anhydrous conditions meta-bromobenzyl chloride and N,N-dimethyl-N'-(2-pyridyl)-ethylenediamine and recovering said product.

4. N,N-dimethyl - N' - (2 - chlorobenzyl) - N' - (2-pyridyl) ethylenediamine having the following structural formula:

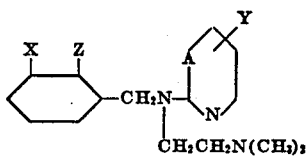

5. Compounds of the group consisting of those having the general formula:

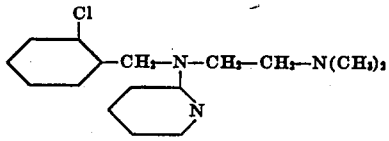

in which X, Y and Z are members of the group consisting of hydrogen and halogen, one being a halogen, A is a member of the group consisting of carbon and nitrogen atoms and salts thereof.

6. Compounds of the group consisting of those having the general formula:

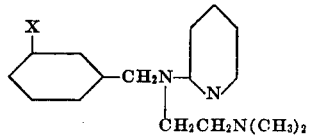

in which X is halogen.

7. A method of preparing compounds of the group consisting of those having the general formula:

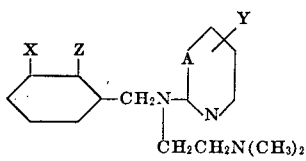

in which X, Y and Z are members of the group consisting of hydrogen and halogen, one being a halogen radical and A is a member of the group consisting of carbon and nitrogen atoms which comprises heating a member of the group consisting of benzyl chloride, an ortho-halobenzyl chloride and a meta-halobenzyl chloride with a compound having the formula:

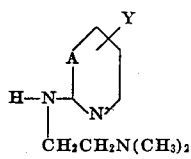

in which A and Y are as defined above, and recovering said compound therefrom.

8. A method of preparing N,N-dimethyl-N'-(ortho-chlorobenzyl)-N'-(2 - pyridyl) - ethylenediamine which comprises heating together in a hydrocarbon solvent under anhydrous conditions ortho-chlorobenzyl chloride and N,N-dimethyl-N'-(2-pyridyl)-ethylenediamine and recovering said compound therefrom.

9. Compounds of the group consisting of those having the general formula:

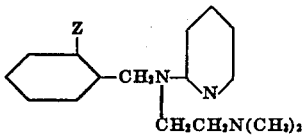

in which Z is a halogen radical.

KENNETH L. HOWARD.

REFERENCES CITED

The following references are of record in the file of this patent:

UNITED STATES PATENTS

| Number | Name | Date |
|---|---|---|
| 2,406,594 | Djerassi | Aug. 27, 1946 |